Patented Apr. 15, 1930

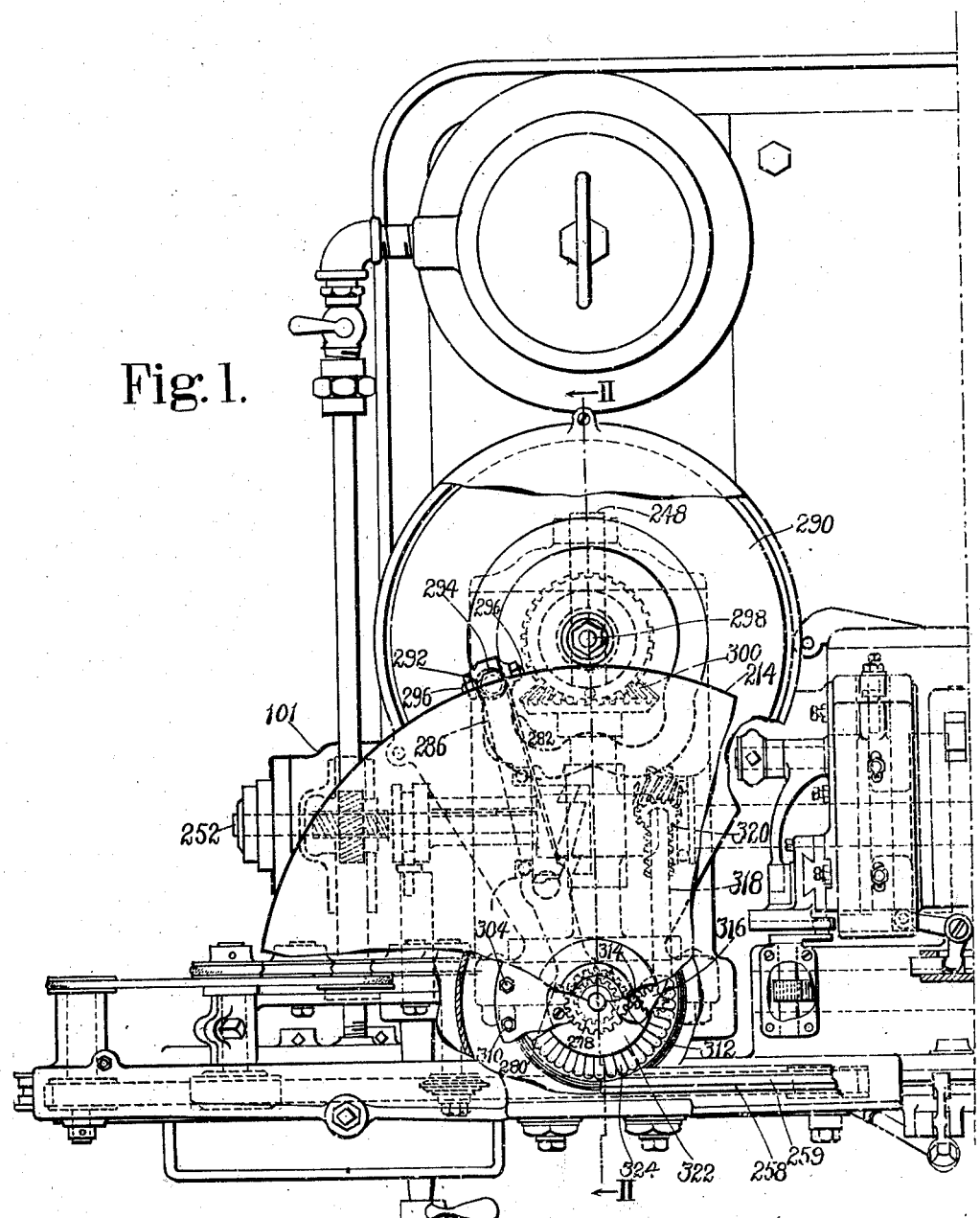

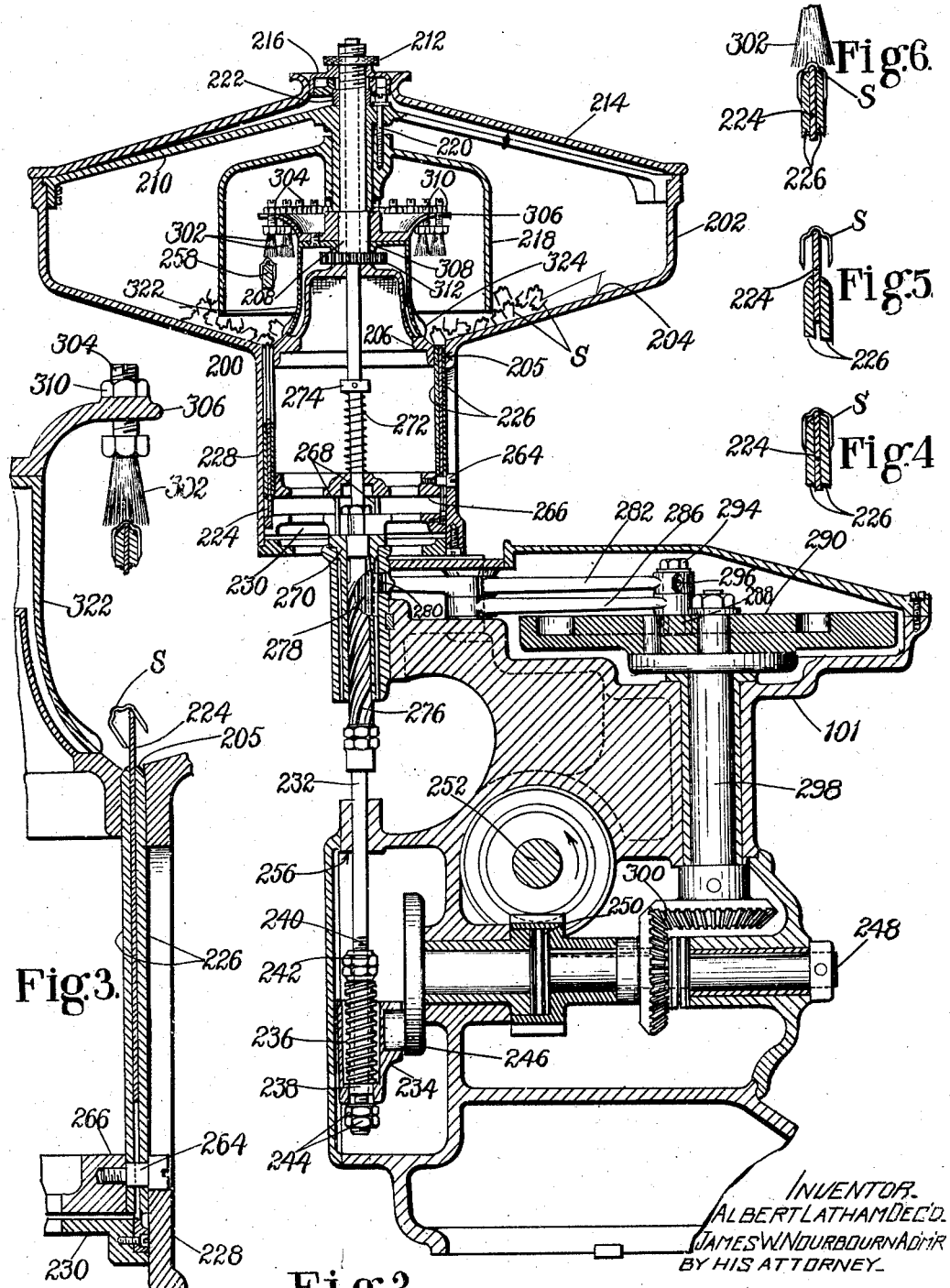

1,754,275

UNITED STATES PATENT OFFICE

ALBERT LATHAM, DECEASED, LATE OF BEVERLY, MASSACHUSETTS, BY JAMES W. NOURBOURN, ADMINISTRATOR, OF SOMERVILLE, MASSACHUSETTS, ASSIGNOR TO AMERICAN BUTTON & FASTENER CO., OF AUGUSTA, MAINE, A CORPORATION OF MAINE

FEEDING MECHANISM

Original application filed November 12, 1921, Serial No. 514,621. Divided and this application filed October 27, 1927. Serial No. 229,188.

This invention relates to mechanism for feeding articles one by one from a mass, it being particularly adapted for thus delivering staples to a machine at which they are to be utilized.

An object of the invention is to effect the delivery of the articles continuously and in a predetermined position preliminary to operations which are to be performed upon them. To this end, there are combined with an article-receptacle and an article-conveyor, as a raceway leading from the receptacle, an article-carrying or elevating member and a plurality of co-operating article-positioning members, together with means movable along and in contact with a series of the positioned articles to advance them to the conveyor. By this organization, the desired relation of the articles is obtained before they are acted upon by the delivering means, and their advance to the conveyor is rapid and orderly. The plural positioning members are especially useful when it may be desired to adjust the articles symmetrically upon a carrying member from a displaced relation either to one side or the other of a desired central position. Such a condition is likely to exist with staples, which may hang by either extremity of their yokes upon the carrying member. In the illustrated embodiment of the invention, both the carrying member, which elevates the articles from the mass in the receptacle, and the positioning members, which are preferably at the inner and outer sides of the carrying member, are in the form of cylinders movable through an annular opening in the bottom of said receptacle. The delivering member appears as a brush. Whatever the form of the members engaging the articles, there is preferably imparted to one or more a plurality of article-engaging movements for each movement of an associated member. Herein the positioning members are disclosed as moved at a different rate from the elevating member, the effect being to first hold the article-engaging portions of the members in substantial alinement, and then to separate these. This causes the articles to be effectively received from the mass, centralized, elevated and delivered. Such article-engaging movements as above outlined are obtained, in the present instance, by means of actuating mechanisms individual to the engaging members, means movable with one of the engaging members being arranged to modify the actuating mechanism of another.

In the accompanying drawings illustrating one of the several embodiments which the invention may assume, Fig. 1 is a top plan view of the improved feeding mechanism;

Fig. 2 is a vertical section on the line II—II of Fig. 1;

Fig. 3 is an enlarged vertical, sectional detail through one side of the feeding mechanism; and Figs. 4, 5 and 6 are sectional details of the co-operating edges of the feeding cylinders, showing them in successive positions.

Supported at one side of a frame-section 101 is a staple-feeder-casing 200, at the top of which is carried a staple-receptacle or hopper 202. The receptacle is cylindrical, having a downwardly and inwardly inclined bottom 204, terminating at an annular space 205 between it and the lower portion of an inner bell-shaped wall 206. This wall is carried by a cylindrical, upward extension 208, fixed in the central opening of the hub of a spider 210 secured upon the top of the hopper 202, the end of this extension being threaded to receive a nut 212, which carries the weight of the wall 206 upon the spider. The top of the hopper 202 is closed by a cover 214 having an axial opening, and which may be centered by an inverted cup 216 formed as a depending skirt from the nut 212. To limit the flow of staples S to the opening 205, preventing them from gathering in too great masses at the points from which they are to be elevated, a cylindrical wall 218 has a central hub surrounding the extension 208, it being supported upon a screw 220 turning in the hub of the spider and being threaded into the hub of the wall. By rotating the screw 220, the wall 218 may be raised and lowered, so that the space between its lower edge and the bottom of the hopper may be varied to control the flow of staples therethrough. The screw may be fixed in its adjusted position by a collar 222 surrounding the extension 208 and having a slot in its side to engage and hold the squared head of the screw. This retaining collar is shown as held in place by the nut 212.

Movable vertically through the annular space 205 in the bottom of the hopper are a central, cylindrical elevating or feeding wall 224 and concentric, inner and outer elevating and positioning walls 226, 226 contacting with the central wall and being guided by a cylindrical portion 228 of the casing 200, which supports the hopper upon the casing 101. The central wall 224 is fixed upon a disk 230, fast upon a spindle 232 guided in the casing 101 and in an axial bore in the extension 208. The spindle is yieldably mounted at its lower extremity upon a slide 234 movable in vertical ways in the casing 101, there being a helical spring 236 surrounding a sleeve 238 threaded upon the spindle at 240 and locked in place by a nut 242, the lower portion of the spring occupying a recess in the slide. Beneath the recess, threaded upon the spindle, is a nut and lock-nut 244 contacting with the bottom of the slide. Entering a depression in the inner face of the slide is the pin of a crank-disk 246 fixed upon the forward extremity of a horizontal shaft 248 rotatable in the casing 101 and constantly driven by spiral-gearing 250 from an actuating shaft 252 journaled across the casing. As the crank-disk 246 is rotated, it raises and lowers the slide, and through the spring 236 carries up the spindle 232 until the nut 242 contacts with a surface 256 upon the casing 101. The spring 236 then yields to give a period of lost-motion, during which the central elevating cylinder rests for a time with its upper edge in alinement with the upper extremity of a staple-raceway or conveying means 258. This raceway is in the form of a bar, which the staples delivered by the elevating cylinder straddle, and the lower end of which is located at the point of utilization of the staples. Above the raceway 258 is carried upon the frame a parallel cover-strip 259, acting to prevent the displacement of the staples. The inner and outer elevating cylinders 226, 226 are secured by a screw 264 (Fig. 3), passing through a slot in the cylinder 224 and also into a slot in the casing-portion 228, to a disk 266 loose upon the spindle 232. This disk rests at its under side upon carrier-pins 268 moving freely through openings in the disk 230 and bearing at their lower extremities upon the upper end of a sleeve 270 surrounding the spindle and turning within the casing 101. A helical spring 272, situated about the spindle, contacts at its upper end with a collar 274 secured to the spindle, and bears at its lower extremity upon the disk 266, this spring tending to keep said disk seated upon its supporting pins. The sleeve 270 has formed upon its interior a helix, engaging a corresponding helix 276 upon the spindle. Upon the outside of the sleeve are elongated gear-teeth 278, with which meshes a segment 280 upon the end of a lever 282 fulcrumed upon the casing. Arranged to turn about the fulcrum of this lever is an arm 286 having a pin 288 projecting into a groove in a cam-disk 290. This pin also passes through an arcuate slot 292 in the adjacent end of the lever 282, and may be fixed in place therein by a nut 294 threaded upon the upper extremity of the pin and bearing against the top of the lever. Screws 296, 296 are threaded through the opposite sides of the lever, with their points entering the slot 292 and bearing against the pin 288. By these screws, the angular position of the lever 282 may be changed, and the adjustment fixed by the nut 294. This, by turning the sleeve 270, varies its height upon the helix 276, and consequently the initial location of the upper edges of the cylinders 226, 226 with reference to the space 205. The disk 290 is secured for rotation to a vertical shaft 298 journaled in the casing 101 and driven by bevel-gearing 300 from the shaft 248. As has already been pointed out, the crank-disk 246 raises the central elevating cylinder from its lowest point, determined by the location of the nuts 244 on the spindle and at which it is beneath the mass of staples over the space 205 in the hopper, to the highest point of its travel, when the nut 242 contacts with the casing-surface 256. The extent of this upward travel may be adjusted by changing the position of the sleeve 238 and nut 242. When the pin 288 is in the circular portion of the groove of the cam 290, the gearing 278, 280 has no effect upon the sleeve 270, so that the helices of the sleeve and spindle engage one another to cause the inner and outer elevating cylinders to rise with the central cylinder. At the beginning of the upward movement of the cylinder 224, however, the pin enters one of the outwardly curved portions of the cam-groove, which so rotates the sleeve 270 that it causes it to be held back upon the helix, retaining the pins 268 and disk 266 lowered under the influence of the spring 272 and allowing the cylinders 226, 226 to remain for a time in their initial position. This brings the upper edge of the cylinder 224 from the plane at which it is illustrated in Fig. 2 of the drawings to that at which it appears in Fig. 3, in which a circumferential group of the staples has been engaged by the moving cylinder and carried above the mass in the hopper. Now the oppositely inclined portion of the cam-groove turns the sleeve 270 in the other direction, raising the pins 268 and the disk 266 until the cylinders 226, 226 overtake the central cylinder. These elements are now related as is shown in Fig. 4, causing the staples to be centralized by the contact of the cylinders 226 with the inner sides of the legs, so that the depressions in their yokes engage the edge of the intermediate cylinder and hang symmetrically thereon. Another relative movement of separation and alinement is imparted to the cylinders by the succeeding portion of the cam-groove, this bringing them into the relation appearing in Fig. 5 and then to that illustrated in Fig. 6. Thereafter, the circular portion of the groove comes into action, and during the remainder of the upward travel the cylinders move together until they have returned to their lowered position. It should be observed that the cam 290 is so designed that when the cylinders are in their staple-receiving position, the upper edges occupy substantially the same horizontal plane (Fig. 2) to permit the staples to readily pass over them, to be taken up by the central cylinder; but that when they are in their final delivering position, as appears at the upper portion of Fig. 3, the central cylinder is slightly elevated above its companions to hold the staples in their true central relation and in correct alinement with the raceway 258.

When the elevating cylinders with the staples which they carry are in the highest position, in co-operation with the raceway 258, said staples are in the plane of movement of delivering or feeding members, here shown as consisting of a circular series of brushes 302. The fibers of these brushes are arranged upon vertical stems 304 depending from the edge of a disk 306 carried upon a sleeve 308 resting upon the inner hopper-wall 206 and having a bearing about its cylindrical portion 208 below the hub of the wall 218. These brush-stems are threaded for vertical adjustment through their disk, being held against rotation by lock-nuts 310. The brushes are revolved continuously by spur-gearing 312 connecting the sleeve 308 and a vertical shaft 314 journaled in the casing 200, which shaft is driven by spiral-gearing 316 from an inclined shaft 318 rotatable in the casing-section 101, this shaft 318 being in turn driven by spiral-gearing 320 from the actuating shaft 252. When the elevating cylinders are in the final or delivering position, (Fig. 3), the brushes 302 act to sweep the staples from them and complete the operation of supplying the raceway 258, down which said staples slide by gravity. If the raceway becomes completely filled with staples, because the rate of supply exceeds that of utilization, the brush-fibers simply yield, without exerting undue pressure upon the accumulated staples. Depending from disk 306 is a skirt 322, extending into proximity to the space 205 and therefore to the staples lying thereover. The skirt has agitating projections 324, which pass through the staples and distribute them about the tops of the cylinders, preventing them from so massing that they bridge over the space and thus fail to settle upon the cylinder 224 for elevating engagement by it.

The present application is a division of that application for improvements in machines for assembling and mounting articles, filed on November 12, 1921, in the name of James W. Nourbourn, administrator of the estate of Albert Latham, deceased, and bearing the Serial No. 514,621. This application matured into Letters Patent No. 1,681,244 on August 21, 1928. Claims generic to this invention are presented in a companion application for improvements in feeding mechanisms, filed on the same date as this application in the name of said James W. Nourbourn, administrator, Serial No. 229,187.

Having described the invention, what is claimed as new and is desired to be secured by Letters Patent of the United States is:

1. In a machine of the class described, an article-receptacle, an article-conveyor leading therefrom, an article-carrying member operating in the receptacle, a plurality of article-positioning members co-operating with the carrying member, delivering means, and means for moving the delivering means along and in contact with a series of positioned articles to advance them to the conveyor.

2. In a machine of the class described, an article-receptacle, an article-conveyor leading therefrom, an article-carrying member operating in the receptacle, a plurality of article-positioning members movable at opposite sides of the carrying member, and means for delivering the positioned articles to the conveyor.

3. In a machine of the class described, an article-receptacle, an article-conveyor leading therefrom, an article-carrying member operating in the receptacle, means for moving the carrying member to elevate articles from those in the receptacle, an article-positioning member cooperating with the carrying member, means for moving the positioning member to arrange the elevated articles upon the carrying member, and means for delivering the positioned articles to the conveyor.

4. In a machine of the class described, an article-receptacle, an article-conveyor leading therefrom, an article-carrying member operating in the receptacle, article-positioning members co-operating with opposite sides of the carrying member, means for moving the positioning members to arrange the elevated articles upon the carrying member, and means for delivering the positioned articles to the conveyor.

5. In a machine of the class described, an article-receptacle, an article-conveyor leading therefrom, an article-carrying member operating in the receptacle, a plurality of article-positioning members co-operating with the carrying member, and a rotatable delivering member arranged to contact with the positioned articles and co-operating with the conveyor.

6. In a machine of the class described, an article-receptacle, an article-conveyor leading therefrom, an article-carrying member operating in the receptacle, means for moving the carrying member to elevate articles from those in the receptacle, an article-positioning member co-operating with the carrying member, means for reciprocating the positioning member to arrange the elevated articles upon the carrying member, and a continuously rotatable member into contact with which the positioned articles are elevated.

7. In a machine of the class described, an article-receptacle, an article-conveyor leading therefrom, an article-carrying member operating in the receptacle, a plurality of article-positioning members movable relatively to and co-operating with the carrying member, article-agitating means and means for delivering the positioned articles to the conveyor.

8. In a machine of the class described, an article-receptacle, a raceway leading therefrom, a cylinder movable in the receptacle to elevate the articles, inner and outer cylinders co-operating with the elevating cylinder and being movable into and out of contact with the articles during their elevation, and means co-operating with the cylinders to deliver articles to the raceway.

9. In a machine of the class described, an article-receptacle, a raceway leading therefrom, a cylinder movable in the receptacle to elevate the articles, a plurality of concentric cylinders co-operating with the elevating cylinder and movable differently therefrom to act upon the articles, and means co-operating with the cylinders to deliver articles to the raceway.

10. In a machine of the class described, an article-receptacle, a raceway leading therefrom, a cylinder movable in the receptacle to elevate the articles, and a brush cooperating with the cylinder to deliver articles to the raceway.

11. In a machine of the class described, an article-receptacle, a raceway leading therefrom, a cylinder movable in the receptacle to elevate the articles, inner and outer cylinders co-operating with the elevating cylinder and being movable into and out of contact with the articles during their elevation, and a rotatable brush co-operating with the cylinders to deliver articles to the raceway.

12. In a machine of the class described, an article-receptacle, a raceway leading therefrom, a cylinder movable in the receptacle to elevate the articles, inner and outer cylinders co-operating with the elevating cylinder and being movable into and out of contact with the articles during their elevation, means co-operating with the cylinders to deliver articles to the raceway, and article-agitating means rotatable with the delivery means.

13. In a machine of the class described, a staple-receptacle, a raceway leading therefrom, a movable carrier member arranged to engage the staple-yokes, means for moving the staples on the carrier member to aline them with the raceway, and means for delivering the alined staples to the raceway.

14. In a machine of the class described, a staple-receptacle, a raceway leading therefrom, a movable carrier member arranged to engage the staple-yokes, means for centralizing the staples transversely of the carrier member, and means for delivering the thus positioned staples to the raceway.

15. In a machine of the class described, a receptacle for staples with yokes having depressions, an elevating member operating in the receptacle and constructed to enter the depressions and support the staples astride, means for moving the staples upon the elevating member to bring the yoke-depressions into engagement with said member, and means for delivering the thus positioned staples to the raceway.

16. In a machine of the class described, a staple-receptacle, a raceway leading therefrom, a movable carrier member arranged to engage the staple-yokes, means contacting with the staple-legs to centralize the staples transversely of the carrier, and means for delivering the thus positioned staples to the raceway.

17. In a machine of the class described, a staple-receptacle, a raceway leading therefrom, a movable carrier member arranged to engage the staple-yokes, a positioning member situated at each side of the carrier member and movable to engage the staple-legs, and means for delivering the staples from the carrier member to the raceway.

18. In a machine of the class described, a staple-receptacle, a raceway leading therefrom, a movable carrier member arranged to engage the staple-yokes, means for moving the staples on the carrier member to aline them with the raceway, and a rotatable brush contacting with the staple-yokes to deliver them to the raceway.

19. In a machine of the class described, an article-receptacle, a plurality of article-engaging members operating therein, means for moving one of the engaging members from an article-receiving to an article-delivering position, and means for imparting to another member a plurality of article-engaging movements for each movement of the associated member.

20. In a machine of the class described, an article-receptacle, an article-elevating member operating in the receptacle, a positioning member for contact with the articles on the elevating member at each side thereof, means for reciprocating the elevating member, and means for reciprocating the positioning member at a different rate from the elevating member.

21. In a machine of the class described, an article-receptacle, an article-engaging member operating therein, an article-engaging member operating at each side of that first mentioned, means for moving the intermediate member from an article-receiving to an article-delivering position, and means for moving the side members simultaneously but at a different rate from the intermediate member.

22. In a machine of the class described, an article-receptacle, an article-engaging member operating therein, an article-engaging member operating at each side of that first mentioned, means for moving the intermediate member from an article-receiving to an article-delivering position, and means for moving the side members a plurality of times for each movement of the intermediate member.

23. In a machine of the class described, an article-receptacle, members operating therein and having portions arranged to engage articles in the receptacle, and means for moving the members from an article-receiving to an article-delivering position, said moving means being arranged to hold the engaging portions of the members in substantial alinement in the receiving position and separating them from each other in the delivering position.

24. In a machine of the class described, an article-receptacle, members operating therein and having portions arranged to enter spaces between portions of articles in the receptacle, and means for moving the members from an article-receiving to an article-delivering position, said moving means being arranged to cause the separation and approach of the engaging portions of the members during the travel from the receiving to the delivering position.

25. In a machine of the class described, an article-receptacle, members operating therein and having portions arranged to enter spaces between portions of articles in the receptacle, and means for moving the members from an article-receiving to an article-delivering position, said moving means being arranged to hold the engaging portions of the members in substantial alinement in the receiving position and cause the separation and approach of the engaging portions of the members within the article-spaces during travel from the receiving to the delivering position.

26. In a machine of the class described, an article-receptacle having at its bottom an annular opening, a plurality of concentric cylinders operating in the opening, means arranged to move the cylinders upwardly through the receptacle at different rates to the delivering position, and delivering means co-operating with the cylinders at such delivering position.

27. In a machine of the class described, an article-receptacle having at its bottom an annular opening, a plurality of concentric cylinders operating in the opening from an initial position in which their upper extremities are at substantially the same height, means arranged to move the cylinders upwardly through the receptacle to different extents, and delivering means co-operating with the cylinders while thus differently related.

28. In a machine of the class described, an article-receptacle having at its bottom an annular opening, a plurality of concentric cylinders operating in the opening from an initial position in which their upper extremities are at substantially the same height, means arranged to move the cylinders upwardly through the receptacle at different rates, and delivering means co-operating with the cylinders at their upper limit of movement.

29. In a machine of the class described, an article-receptacle having at its bottom an annular opening, a plurality of concentric cylinders operating in the opening from an initial position in which their upper extremities are at substantially the same height, means arranged to move the cylinders upwardly through the receptacle at different rates, a brush movable over the upper extremities of the cylinders while at their upper limit of movement, and a raceway to which the brush delivers the articles.

30. In a machine of the class described, an article-receptacle, a plurality of article-engaging members movable therein, an actuating mechanism individual to each engaging member, and means movable with one engaging member and arranged to modify the actuating mechanism of another engaging member.

31. In a machine of the class described, an article-receptacle, a plurality of article-engaging members movable therein, a support for each engaging member, and actuating mechanism individual to each engaging member, the supports having co-operating portions which modify the effect of one of the actuating mechanisms.

32. In a machine of the class described, an article-receptacle, a plurality of article-engaging members movable therein, a support for each engaging member, actuating mechanism arranged to reciprocate one of the supports, and actuating mechanism arranged to rotate another support, the supports co-operating to cause the reciprocation of the rotatable support.

33. In a machine of the class described, an article-receptacle, a plurality of article-engaging members movable therein, a support for each engaging member, actuating mechanism arranged to intermittently reciprocate one of the supports, and actuating mechanism arranged to rotate another support, the supports having co-operating portions arranged to cause the supports to be locked to move together during the period of non-rotation and the rotatable support to reciprocate differently from the associated support during the period of rotation.

34. In a machine of the class described, an article-receptacle, a plurality of article-engaging members movable therein, a spindle upon which one engaging member is supported, a sleeve supporting another engaging member and surrounding the spindle, there being co-operating helices upon the spindle and sleeve, means for reciprocating the spindle, and means for rotating the sleeve.

35. In a machine of the class described, an article-receptacle, a plurality of article-engaging members movable therein, a spindle upon which one engaging member is supported, a sleeve supporting another engaging member and surrounding the spindle, there being co-operating helices upon the spindle and sleeve, crank mechanism for actuating the spindle, and a cam for actuating the sleeve.

In testimony whereof I have signed my name to this specification.

JAMES W. NOURBOURN,
*Administrator of the Estate of Albert Latham, Deceased.*